United States Patent [19]

Stedman et al.

[11] Patent Number: 5,720,504
[45] Date of Patent: Feb. 24, 1998

[54] CONVOLUTED FLUID CONNECTOR ASSEMBLY WITH HARDENED END PORTION

[75] Inventors: Thomas G. Stedman, Irwin; John R. Stein, Trafford; Michael A. Mantia, Gibsonia; Sam A. Brunetto, Jr., Pittsburgh, all of Pa.

[73] Assignee: Dormont Manufacturing Company, Export, Pa.

[21] Appl. No.: 625,178

[22] Filed: Mar. 29, 1996

[51] Int. Cl.$^6$ .................................. F16L 19/08
[52] U.S. Cl. .................. 285/226; 285/903; 285/422; 285/382.7; 285/341; 138/121
[58] Field of Search ................ 285/341, 342, 285/903, 422, 382.7, 226; 138/121, 173

[56] References Cited

U.S. PATENT DOCUMENTS

| | | | |
|---|---|---|---|
| 2,232,657 | 2/1941 | Davis | 285/422 |
| 2,420,153 | 5/1947 | Spencer et al. | 285/422 |
| 2,460,741 | 1/1949 | Friedman | 285/382.7 |
| 2,582,249 | 1/1952 | Hendel | 285/422 |
| 3,008,738 | 11/1961 | Longfellow | 285/422 |
| 3,273,916 | 9/1966 | Tillery | 285/226 |
| 3,388,705 | 6/1968 | Grosshanoger | 285/226 |
| 3,743,328 | 7/1973 | Longfellow | |
| 4,289,340 | 9/1981 | Press et al. | 285/422 |
| 4,691,726 | 9/1987 | Studer et al. | |
| 4,940,263 | 7/1990 | Mayernik | 285/354 |
| 5,131,696 | 7/1992 | Sykes et al. | |
| 5,423,578 | 6/1995 | Kanomata et al. | |
| 5,441,312 | 8/1995 | Fujiyoshi et al. | |
| 5,538,294 | 7/1996 | Thomas | 285/903 |
| 5,547,233 | 8/1996 | Noegger | 285/422 |
| 5,553,893 | 9/1996 | Foti | 285/168 |

FOREIGN PATENT DOCUMENTS

| | | | |
|---|---|---|---|
| 865999 | 6/1941 | France | 285/342 |
| 2641842 | 7/1990 | France | 285/342 |
| 3445662 | 6/1986 | Germany | 285/903 |
| 490115 | 8/1938 | United Kingdom | 285/342 |

Primary Examiner—Eric K. Nicholson
Attorney, Agent, or Firm—Paul A. Beck & Associates

[57] ABSTRACT

A fluid connector assembly having a flexible austenitic annealed stainless steel 300 series corrugated convoluted tube. At least one end of the tube has a smooth end which is free of convoluted corrugations. The corrugated portion has a hardness range of 150 to 190 points Vickers and the smooth end of the tube has a range of hardness of 275 to 380 points Vickers. A metal compression nut is used in combination with a metal compression ring in a metal fitting the smooth end to couple. The metal fitting is capable of coupling the fluid connector to another connector.

4 Claims, 2 Drawing Sheets

CONVOLUTED FLUID CONNECTOR ASSEMBLY WITH HARDENED END PORTION

FIELD OF THE INVENTION

This invention relates to a fluid connector assembly. The fluid connector assembly utilizes a compression fitting in combination with corrugated flexible tubing. It provides for the safe flow of fluid, such as natural gas or liquid, to appliances and within appliances. It is ideal to use in connecting tubing carrying fluids in small confined areas where flexibility and reduced size are required.

BACKGROUND OF THE INVENTION AND PROBLEM PRESENTED TO THE INVENTORS

Current tubing of relatively small diameter for carrying fluid or gas comprises rigid pipe that possesses no flexibility for installation. Frequently the tubing being used has included rigid copper or aluminum tubing with compression fittings for making a sealed joint or connection with another fitting. In working in small confined areas, particularly within appliances and adjacent to appliances bending the rigid copper or aluminum tubing can cause problems with the compression seal or the compression ring and may cause kinking and requires bending equipment. It is also very difficult to maneuver rigid tubing in those areas. When bending the rigid tubing, frequently the compression seal becomes loose and causes gas leakage or the tubing may kink causing reduced flow or present the potential for cracking.

SUMMARY OF THE INVENTION

The present invention provides a fluid connector assembly which utilizes a compression fitting in combination with a flexible austenitic annealed stainless steel 300 series corrugated convoluted tube. At least one end of the tube has a smooth end which is free of corrugated convolutes. The corrugated portion of the tube has a hardness range of 150–190 points Vickers. The smooth end of the tube, which has no corrugations, has a range of hardness of 275–380 points Vickers. The tube can have a range of outside diameter of 0.125 inches to 0.75 inches. This is considered to be a relatively small diameter tubing for its intended use. In this environment, bending is very critical because one is frequently working in confined areas. A metal compression nut is inserted around the smooth end of the corrugated tube and a metal compression ring is inserted within the metal nut which is threaded onto a metal fitting which couples the tube to an appliance or another tube or fitting.

It has been found that this particular type of stainless steel series corrugated tubing together with the differential in hardness between the corrugated portions on the tube and the smooth end of the tube provides an excellent balance for flexibility where it is required and relevant hardness at the ends where the compression ring is to be used. If the area where the compression ring and compression nut are to be used and coupled with the metal fitting were too soft, it would have a tendency to penetrate and deform the metal to the point where a proper seal upon movement of the tubing could become a problem. It has been found that making the metal harder will avoid this problem. The best range of hardness appears to be between 275 and 380 points Vickers. While the hardness is advantageous at the tip or end of the fluid connector assembly tubing where the metal compression ring is utilized in combination with a metal compression nut to connect to a metal fitting, this same hardness is a disadvantage at the corrugated convoluted portion which requires considerable sharp bends. Frequent bending and reverse bending of hard tubing in the corrugated area could cause work hardening and ultimate failure by splitting. Also the harder metal is more difficult to bend because it has less flexibility. For that reason it has been found to be better to have a lower range of hardness between 150 to 190 points Vickers in the corrugated portion of the tubing.

DETAILED DESCRIPTION OF THE PREFERRED AND ILLUSTRATED EMBODIMENTS

Figure 1:
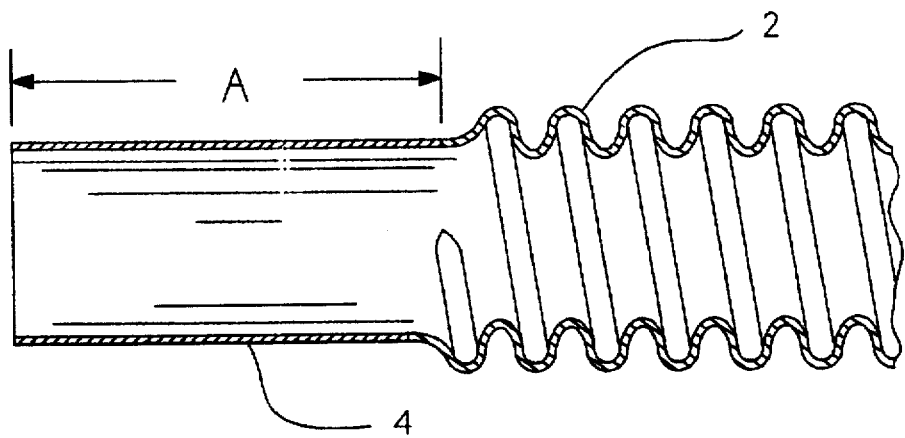
FIG. 1 is a fragmentary sectional view of the fluid connector assembly.
Figure 2:
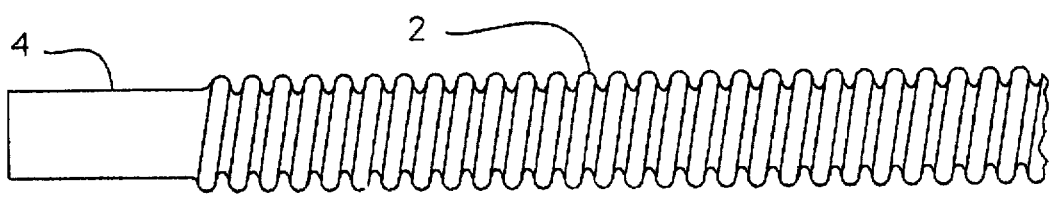
FIG. 2 is a partial elevational view of a fluid connector assembly.
Figure 3:
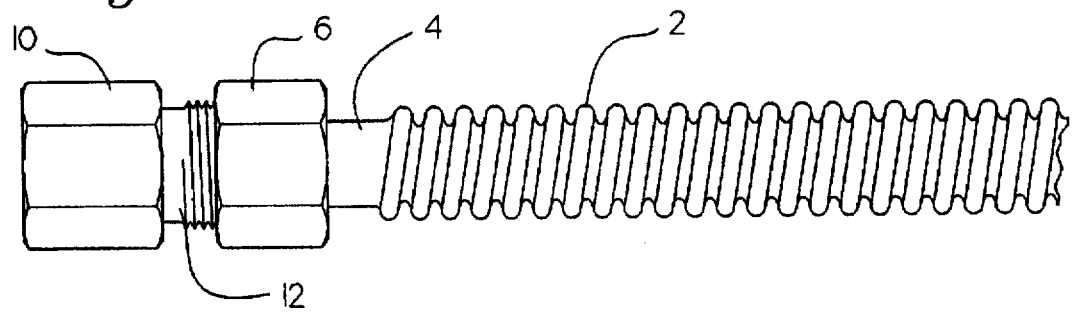
FIG. 3 is a fitting applied to the fluid connector assembly shown in FIG. 2.
Figure 4:
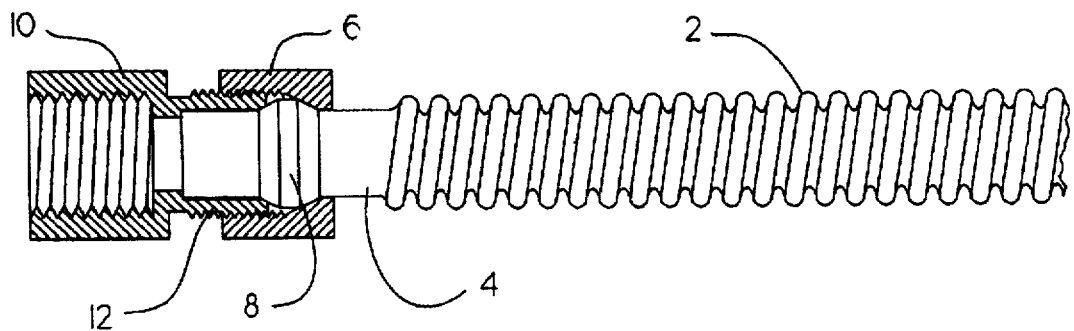
FIG. 4 is a fluid connector assembly shown in FIG. 3 showing the fitting in section.

FIGS. 1–5 show a fluid connector assembly. The fluid connector assembly has a flexible austenitic annealed stainless steel 300 series tube. The tubing has corrugated convolutes 2. The corrugated convoluted tube has a smooth end, FIG. 1, shown as A and also as 4 in FIG. 1 and the other figures. This smooth end A and 4 is free of corrugated convolutes 2. The corrugated convoluted portion 2 has a hardness range of 150 to 190 points Vickers. The smooth end A or 4 of the tube has a range of hardness of 275 to 380 points Vickers. A metal compression nut 6 is inserted around the smooth end A or 4. A metal compression ring 8 is inserted within the metal compression nut 6. A metal fitting 10 which has a male threaded end 12 on an outside diameter is threaded into the metal compression nut 6 compressing the metal compression ring 8 around the tubing thereby sealing the coupling of the nut 6, fitting 10 and tubing.

Figure 5:
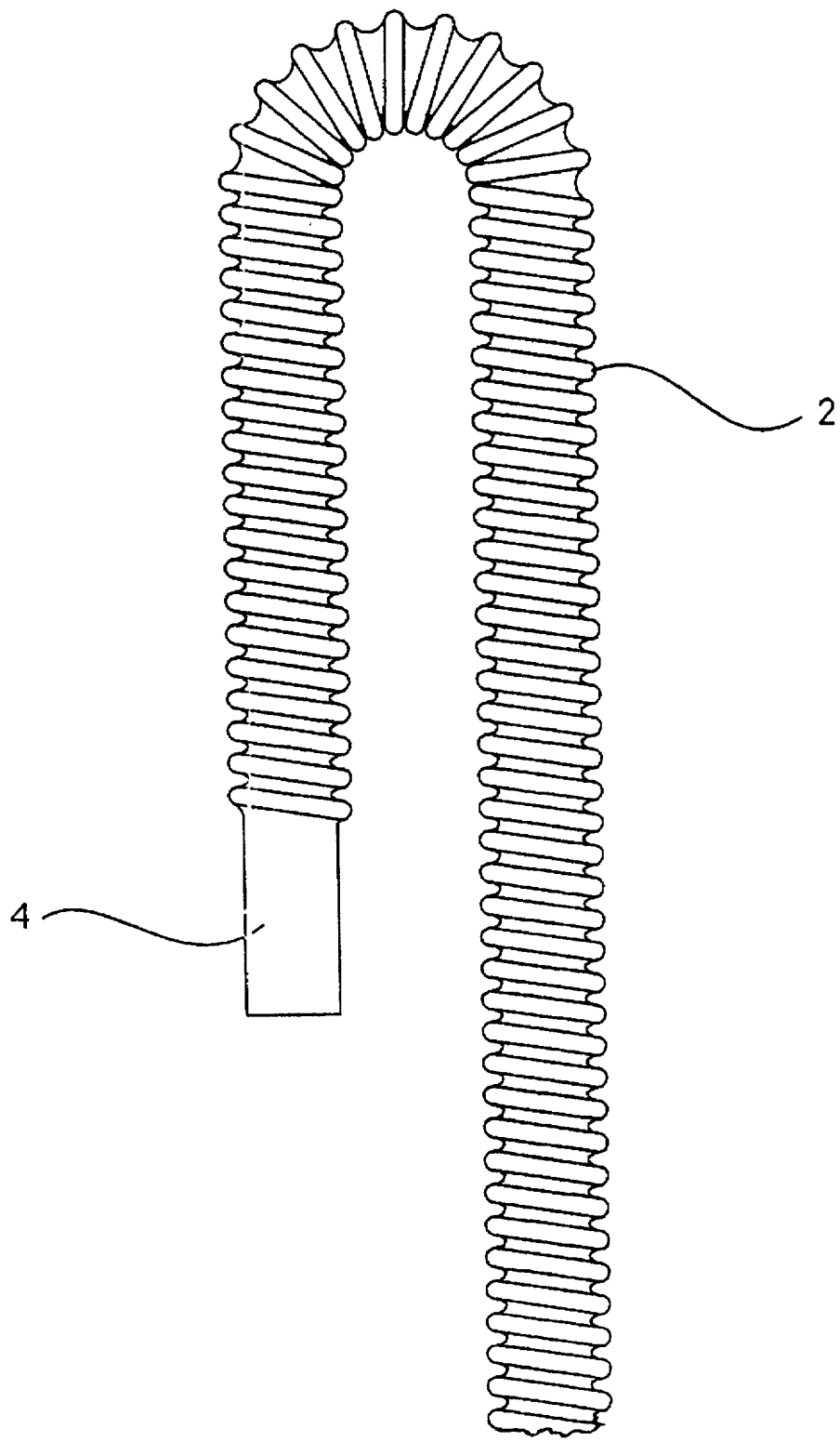
FIG. 5 shows the fluid connector assembly as shown in FIG. 2 with a severe bend in the fluid connector.

The differential of hardness and the range of hardness between the smooth end A or 4 and the corrugated convolutes 2 is such that bending and reverse bending in the corrugated convolutes can be achieved repeatedly without causing excessive work hardening and fracture and facilitates the bending shown in FIG. 5 while the smooth portion A or 4 at its relative elevated hardness in comparison to the hardness of the convolutes 2 permits the use of the compression ring 8 to grip without fracturing or penetrating the metal tubing. This ensures the flexibility that is required can be achieved safely without fracture and also ensures the compression coupling and sealing safely without fracture. A fracture can be very serious particularly when the coupling is used for the transmission of gas, especially explosive or toxic gases. This structure reduces that danger.

It is understood that this coupling can be used for all types of fluids such as gas, liquid and vacuum which is considered a negative pressure gas. It is to be understood that the fluid that is used with this structure is not in any way limited. The fluid connector assembly can have a range of outside diameter of 0.125 inches up to 0.75 inches. This is found to be the typical diameter range where severe bends are found in that application and that diameter range in combination with the relative differential of hardness between the convolutes and the smooth end is very effective.

The method of making the fluid connector assembly is to start with a stainless steel 300 series corrugated convoluted tube of the desired diameter. The tube has not yet been cut to length. On at least one end the pitch or profile of the corrugated convolutes are reduced by approximately 50% fewer corrugated convolutes. This is performed by stretching this end.

The tube is then cut to the required length. Stress in the tubing caused by work hardening in producing the convolutes is relieved by a full solution furnace annealed at 2000 degrees Farhenheit to reduce the entire tube hardness down to a range of 150 to 190 points Vickers.

The deconvoluted end of the tube is then rotary swaged by four dies. The tube is rotated relative to the dies and the hardness is brought up to 275–380 points Vickers. The convolutes are then completely removed by the swaging. The deconvoluted smooth end is approximately 1½ inches long from the end tip of the tube. Any remaining rough edges and burrs are removed.

The compression ring and compression nut are placed over the smooth end. The compression nut is placed over the smooth end. The compression nut is ready to receive a threaded metal fitting which in combination with the compression ring and compression nut create a quality seal and prevents any fluid passing in the tube from leaking at the compression coupling.

It is to be understood that various modifications could be made in the present invention without departing from the main teachings of it.

We claim:

1. A fluid connector assembly comprising:
   (a) a flexible austenitic annealed stainless steel 300 series corrugated convoluted tube having at least one smooth end which is free of convoluted corrugations, the corrugated portion having a hardness range of 150 to 190 points Vickers, the smooth end of the tube having a range of hardness of 275 to 380 points Vickers;
   (b) a compression nut inserted around the smooth end;
   (c) a compression ring inserted within the metal nut; and
   (d) a fitting having a male threaded end on an outside diameter for threading into the metal compression nut and compressing the metal compression ring when the metal compression nut and the metal fitting are threaded together.

2. A fluid connector assembly as recited in claim 1 wherein the tube has a range of an outside diameter of 0.125 inches to 0.75 inches.

3. A fluid connector comprising:
   a flexible austenitic annealed stainless steel 300 series corrugated convoluted tube having at least one smooth end which is free of convoluted corrugations, the corrugated portion having a hardness range of 150 to 190 points Vickers, the smooth end of the tube having a range of hardness of 275 to 380 points Vickers.

4. A fluid connector assembly comprising:
   (a) a flexible austenitic annealed stainless steel 300 series corrugated convoluted tube having at least one smooth end which is free of convoluted corrugations, the corrugated portion having a hardness range of 150 to 190 points Vickers, the smooth end of the tube having a range of hardness of 275 to 380 points Vickers;
   (b) a fitting means for coupling the fluid connector assembly to other fittings; and
   (c) coupling means inserted on the smooth end coupling the fitting means to the corrugated convoluted tube.

* * * * *